United States Patent
Morishita et al.

(10) Patent No.: US 7,086,287 B2
(45) Date of Patent: Aug. 8, 2006

(54) ELECTROSTATIC CONDENSER TYPE PRESSURE SENSOR, AND METHOD FOR MANUFACTURING THE PRESSURE SENSOR

(75) Inventors: Sadaharu Morishita, Kusatsu (JP); Takashi Toya, Moriyama (JP); Shinsuke Yoshida, Nagaokakyo (JP); Satoshi Nozoe, Toyonaka (JP); Daisuke Kuzuyama, Kusatsu (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/452,605

(22) Filed: Jun. 2, 2003

(65) Prior Publication Data

US 2003/0221493 A1 Dec. 4, 2003

(30) Foreign Application Priority Data

Jun. 3, 2002 (JP) .............................. 2002/161810

(51) Int. Cl.
   *G01L 9/00* (2006.01)
(52) U.S. Cl. ...................................... 73/716; 316/283.1
(58) Field of Classification Search .................. 73/716, 73/718, 724; 361/283.1
   See application file for complete search history.

(56) References Cited

U.S. PATENT DOCUMENTS

| | | | |
|---|---|---|---|
| 4,292,659 A * | 9/1981 | Lao | 361/283.4 |
| 5,886,249 A * | 3/1999 | Bonne et al. | 73/24.02 |
| 6,252,759 B1* | 6/2001 | Lange et al. | 361/283.1 |
| 6,324,914 B1* | 12/2001 | Xue et al. | 73/718 |
| 6,578,427 B1* | 6/2003 | Hegner | 73/724 |

FOREIGN PATENT DOCUMENTS

| | | |
|---|---|---|
| JP | 5-288623 | 11/1993 |
| JP | 8-240500 | 9/1996 |
| JP | 10-111206 | 4/1998 |

OTHER PUBLICATIONS

Patent Abstracts of Japan, Publication No. 05-288623 dated Nov. 2, 1993 (2 pgs.).
Patent Abstracts of Japan, Publication No. 10-111206 dated Apr. 28, 1998 (2 pgs.).
Patent Abstracts of Japan, Publication No. 08-240500 dated Sep. 17, 1996 (2 pgs.).

* cited by examiner

*Primary Examiner*—Edward Lefkowitz
*Assistant Examiner*—Andre Allen
(74) *Attorney, Agent, or Firm*—Osha Liang LLP

(57) ABSTRACT

The present invention provides a small-sized electrostatic condenser type pressure sensor having high assembly accuracy but no dispersion in a detection accuracy, and a method for manufacturing the pressure sensor. An annular spacer is mounted on the confronting faces of substrates around flat electrodes, and a frit is mounted around the spacer and is made of a material having a lower softening or melting point than that of the spacer.

2 Claims, 6 Drawing Sheets

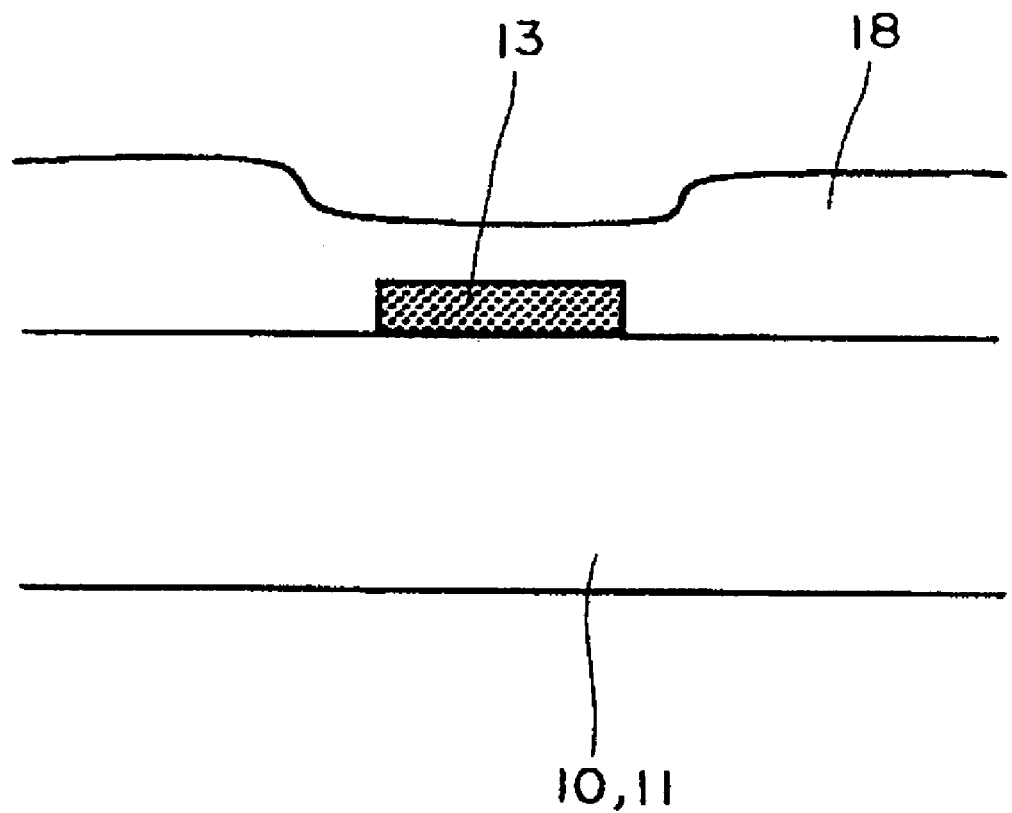

ELECTROSTATIC CONDENSER TYPE PRESSURE SENSOR, AND METHOD FOR MANUFACTURING THE PRESSURE SENSOR

BACKGROUND OF THE INVENTION

1. Field of the Invention

The present invention relates to an electrostatic condenser type pressure sensor and a method for manufacturing the pressure sensor.

2. Background Art

In the related art, the electrostatic condenser type pressure sensor is constructed such that flat electrodes mounted on the individual confronting faces of two substrates are arranged to confront each other in parallel at a predetermined spacing. The pressure sensor is enabled to detect a pressure loaded from the outside, by detecting the change in the electrostatic capacity, as caused when one of the substrates is warped in the thickness direction by the external pressure.

Therefore, the spacing between the confronting electrodes has an extremely important meaning for uniformity for the detection accuracy. In JP-A-5-288623 or JP-A-10-111206, methods are disclosed using five ceramic and resin, respectively, beads to retain a predetermined electrode gap, for example.

However, either method uses the fine balls by mixing with a fluid adhesive. When the two substrates are made to confront each other and are integrally jointed so that the diameter of the fine balls may be the distance between the confronting substrates, therefore, the adhesive spreads, before solidified, more than necessary between the substrates. As a result, dispersion occurs in the fulcrum distance for supporting the diaphragms or substrates to be warped in the thickness direction by the external pressure. Thus, a problem arises in that the uniform detection accuracy is hardly obtained them the adjusting operation becomes complicated.

In JP-A-8-240500, on the other hand, there is disclosed a method for retaining a predetermined electrode gap by using a spacer having a discontinuous but uniform height in an electrostatic condenser type pressure sensor having a frit of a lower softening point than that of the spacer around the spacer.

As the external diameter of the substrates is made smaller, however, the pressure sensor has to arrange the frit near the discontinuous spacer, then the frit softened is allowed to invade through the spacer and is solidified. Therefore, dispersion also occurs in the fulcrum distance for supporting the diaphragms or substrates to be warped in the thickness direction by the external pressure. Thus, a problem arises in that the uniform detection accuracy is hardly obtained.

SUMMARY OF THE INVENTION

In view of the above-specified problems, the present invention has an object to provide a small-sized electrostatic condenser type pressure sensor having a high assembly accuracy but no dispersion in a detection accuracy, and a method for manufacturing the pressure sensor.

In order to achieve the above-specified object, according to an aspect of the invention, an electrostatic condenser type pressure sensor is provided comprising flat electrodes confronting each other at a predetermined spacing and mounted on the confronting faces of two substrates. The pressure sensor is constructed such that an annular spacer is mounted on the confronting faces of the substrates around the flat electrodes, and such that a frit is mounted around the spacer and made of a material having a lower softening or melting point than that of the spacer.

According to the invention, therefore, the spacer has a higher softening or melting point than that of the frit and is positioned on the inner side of the frit. Even if the substrate having the frit and the substrate having the spacer are integrally jointed at a temperature of the softening or melting point of the frit, therefore, the spacer is neither softened nor melted but is clamped between the two substrates so that a predetermined electrode gap can be retained. Moreover, the annular spacer blocks the inward invasion of the frit softened or melted. Therefore, no dispersion occurs in the fulcrum distance of the diaphragms or substrates, which are warped in the thickness direction by the pressure from the outside. An electrostatic condenser type pressure sensor having uniform detection accuracy is obtained. Especially according to the invention, the frit can be arranged near the spacer to provide a small-sized electrostatic condenser type pressure sensor having a small substrate area.

According to another aspect of the invention, a cut portion may be formed in that portion of the annular spacer, in which it overlaps with a lead wire of the electrode.

Even in case the spacer having a uniform height is formed on the surface of the substrate having a lead wire, according to this aspect of the invention, the cut portion is formed in the portion, in which it overlaps with the lead wire of the electrodes, so that the spacer does not partially rise but takes a uniform height. When one substrate is jointed integrally with the other substrate, therefore, these two substrates are parallel to each other and are not inclined, then the detection accuracy is made more uniform.

According to still another aspect of the invention, that portion of the annular spacer, in which it overlaps with a lead wire of the electrodes, may be formed low.

According to this aspect of the invention, therefore, the annular spacer has a uniform height excepting that portion in which it overlaps with the electrode lead wire. Therefore, the two substrates can be integrally jointed in parallel with each other while retaining the predetermined electrode gap.

According to a further aspect of the invention, there is provided a method for manufacturing an electrostatic condenser type pressure sensor. The method comprises: the step of forming an annular spacer around a flat electrode mounted on one face of a first substrate; the step of forming a frit of a material having a lower softening or melting point than that of the spacer, around a flat electrode mounted on one face of a second substrate and with a larger internal diameter than the external diameter of the spacer; and the step of jointing the second substrate integrally with the first substrate at a temperature of the softening or melting point of the frit.

According to the invention, the spacer has a higher softening or melting point than that of the frit and is positioned on the inner side of the frit. Even if the substrate having the frit and the substrate having the spacer are integrally jointed at a temperature of the softening or melting point of the frit, therefore, the spacer is neither softened nor melted but is clamped between the two substrates so that a predetermined electrode gap can be retained. Moreover, the spacer is mounted on the inner side of the frit so that it blocks the inward invasion of the frit. Therefore, no dispersion occurs in the fulcrum distance of the diaphragms or substrates, which are warped in the thickness direction by the pressure from the outside, thereby a small-sized electrostatic condenser type pressure sensor having a uniform decision accuracy is provided. Especially according to the invention, the frit can be arranged near the spacer. Therefore, an effect is obtained to provide a small-sized electrostatic condenser type pressure sensor having a small substrate area.

BRIEF DESCRIPTION OF THE DRAWINGS

FIG. 1A is a sectional view before the pressure sensor is jointed, and FIG. 1B is a sectional view after the pressure sensor was jointed;

FIG. 2A is an enlarged sectional view before the pressure sensor is jointed, and FIG. 2B is an enlarged sectional view after the pressure sensor was jointed;

FIG. 3A is a bottom view of a diaphragm, and FIG. 3B is a top plan view of a base;

FIG. 5A is a partially enlarged view showing a base before jointed, and FIG. 5B is a partially enlarged view showing the base after jointed; and FIG. 6 is a partially enlarged view showing another embodiment of the invention.

DESCRIPTION OF THE PREFERRED EMBODIMENTS

Figure 1:
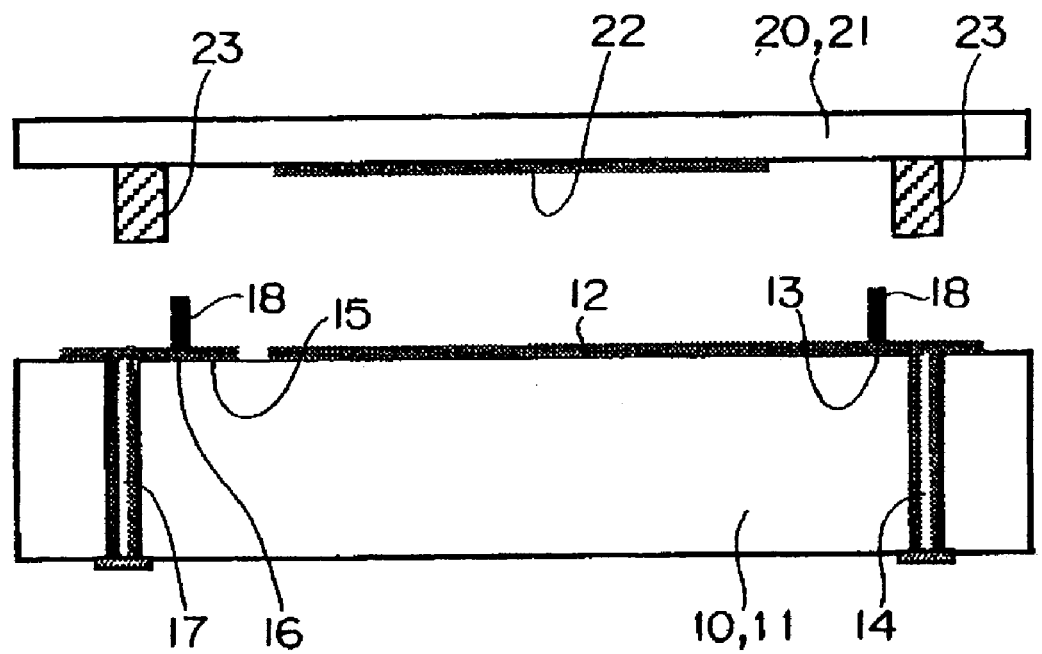
FIG. 1A and FIG. 1B show a first embodiment of an electrostatic condenser type pressure sensor according to the present invention.
Figure 1:
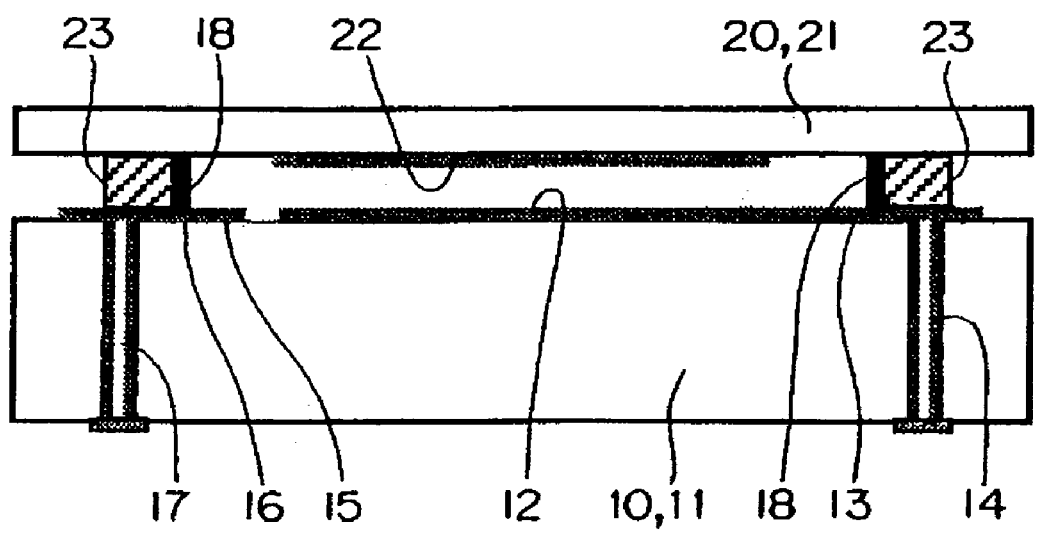
Figure 2:
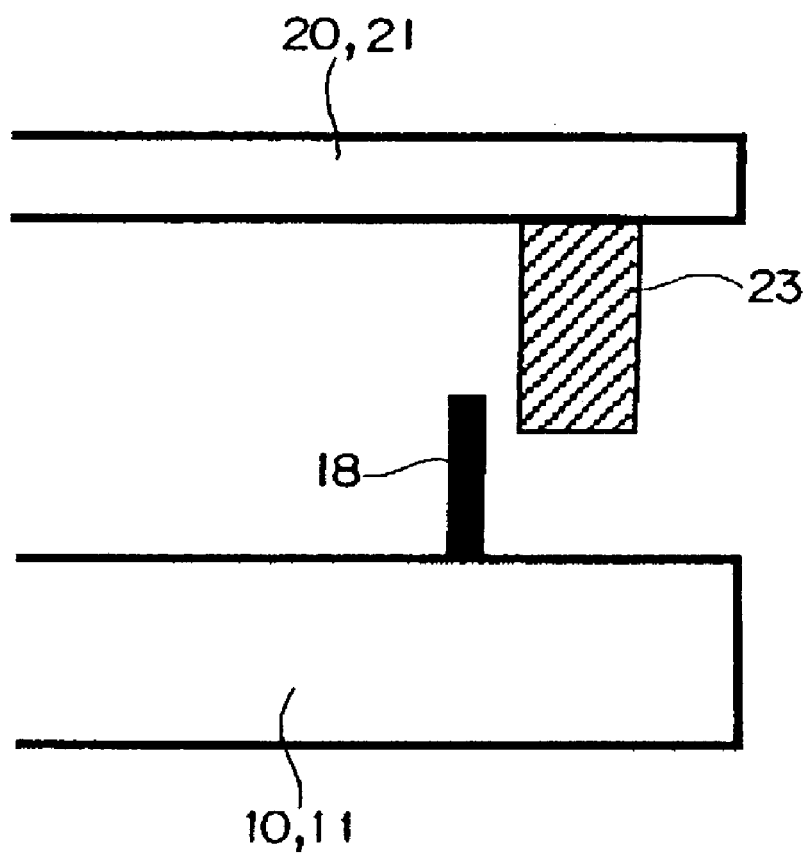
FIG. 2A and FIG. 2B present enlarged sectional views showing a jointing step of the first embodiment shown in FIGS. 1A and 1B.
Figure 2:
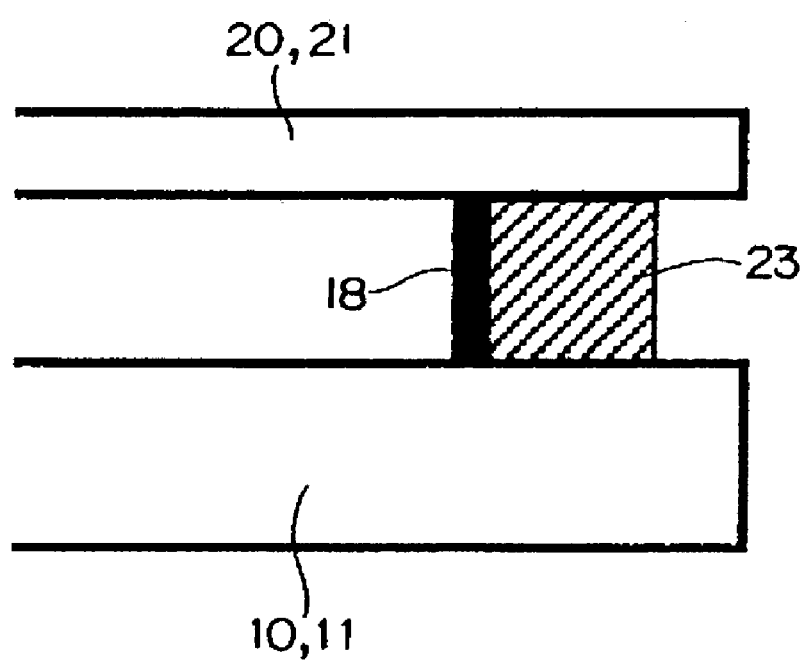
Figure 3:
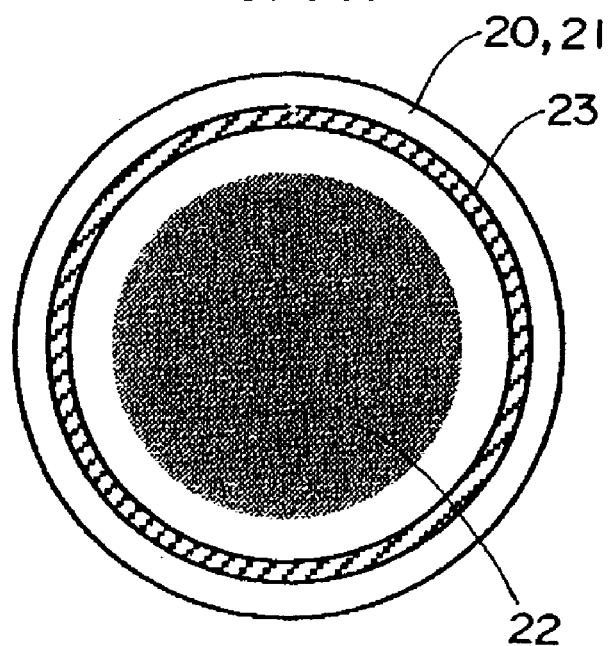
FIG. 3A and FIG. 3B show the components shown in FIG. 1A and FIG. 1B.
Figure 3:
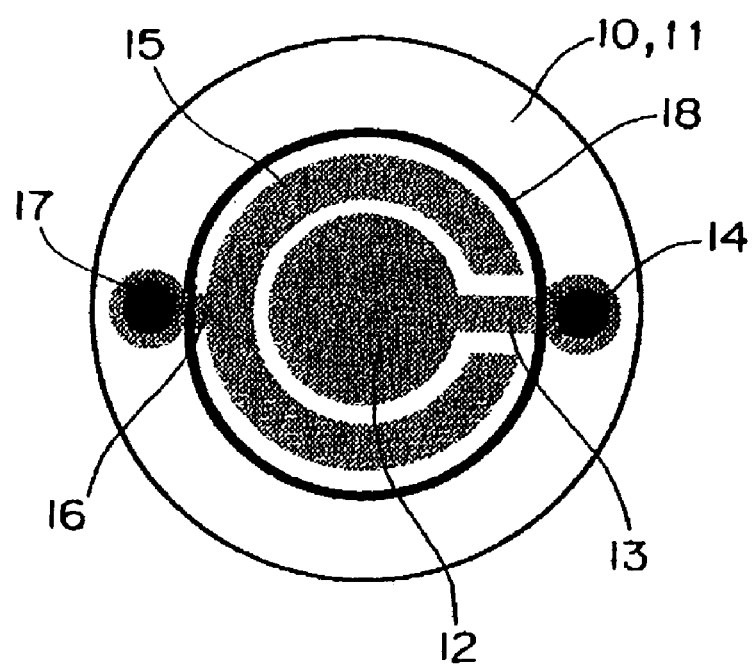

Embodiments according to the present invention will be described with reference to the accompanying drawings of FIGS. 1A and 1B to FIG. 6.

In the first embodiment according to the invention, as shown in FIGS. 1A and 1B to FIGS. 4A to 4D, a base 10 and a diaphragm 20 are integrally jointed while confronting each other.

As shown in FIG. 3B, the base 10 is provided with a first fixed electrode at the center of the upper face of a thick ceramic substrate 11, and the first fixed electrode 12 is connected through a lead wire 13 with a through hole 14. Moreover, a approximately C-shaped second fixed electrode 15 arranged around the first fixed electrode 12 is connected through a lead wire 16 with a through hole 17. Therefore, the electric connection can be made through the through holes 14 and 17 from the lower face side of the ceramic substrate 11. An annular spacer 18 is arranged around the second fixed electrode 15.

The first and second fixed electrodes 12 and 15, the lead wires 13 and 16 and the through holes 14 and 17 are formed by the existing method of printing or plating a conductive material such as Au or Ag.

The spacer 18 retains a predetermined electrode gap and blocks invasion of a later-described frit 23 of the diaphragm 10. The spacer 18 can be formed, for example, by the existing method of printing or plating glass having a softening point of 540° C., Ni-paste having a melting point of 1,455° C. or Cu having a melting point of 1,083° C.

In the diaphragm 20, a movable electrode 22 is formed on the lower face of the thin ceramic substrate 21, and the annular frit 23 is formed around the movable electrode 22. The frit 23 is made of a material having a lower softening or melting point and formed to have an internal diameter equivalent to or larger than the external diameter of the spacer 18.

The movable electrode 22 can be formed of the same material and by the same method as those of the first and second fixed electrodes 12 and 15. On the other hand, the frit 23 can be formed, for example, by the existing method of printing or plating glass having a softening point of 370° C. or an AuSn soldering material having a melting point 280° C.

Figure 4:
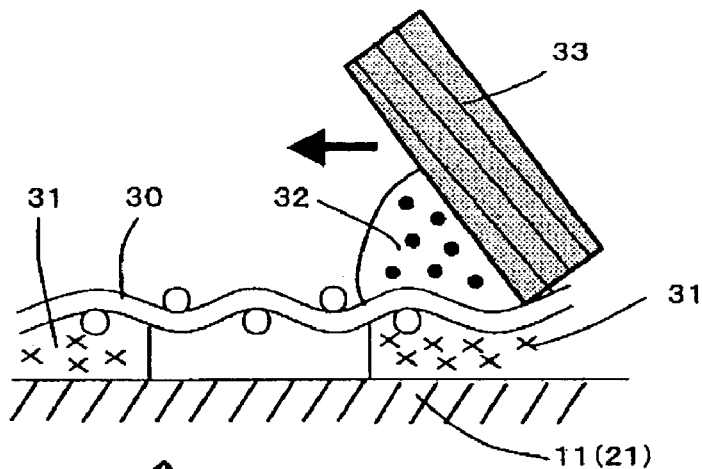
FIG. 4A to FIG. 4D are step diagrams for explaining a screen printing to be used in the invention.
Figure 4:
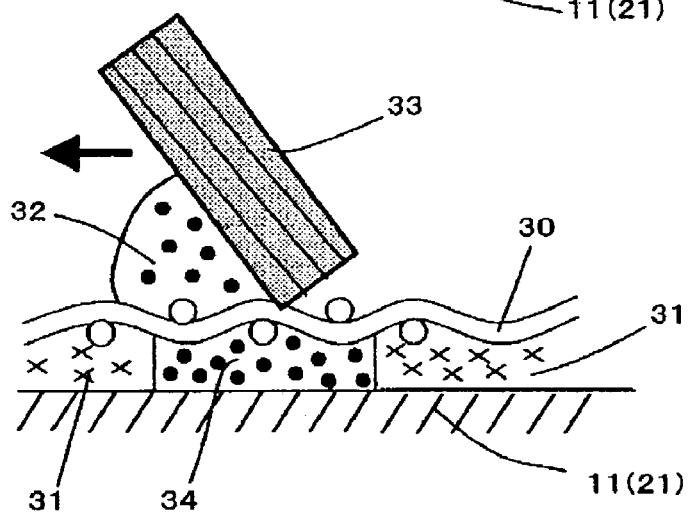
Figure 4:
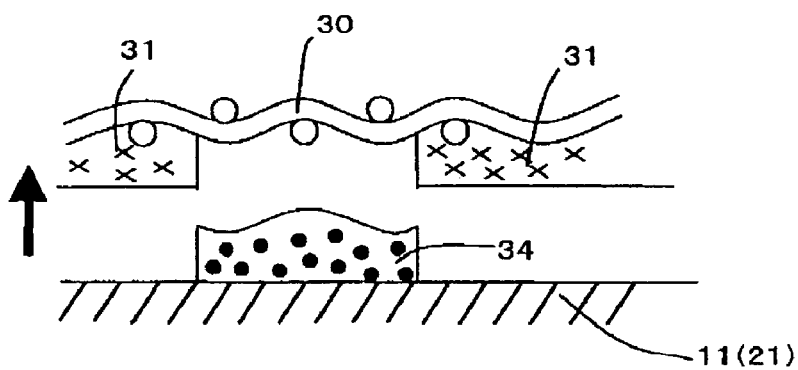
Figure 4:
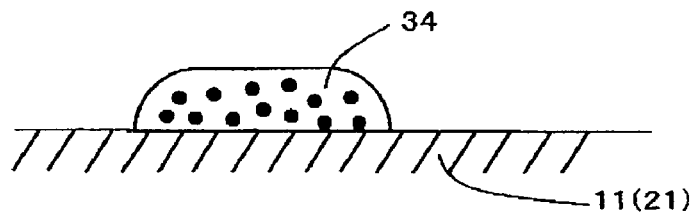
Figure 5:
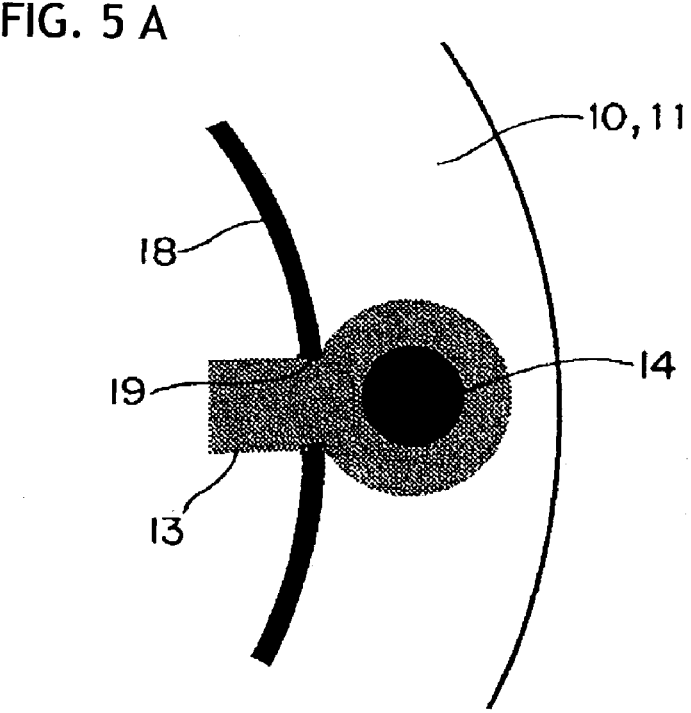
FIG. 5A and FIG. 5B show a second embodiment of the invention.
Figure 5:
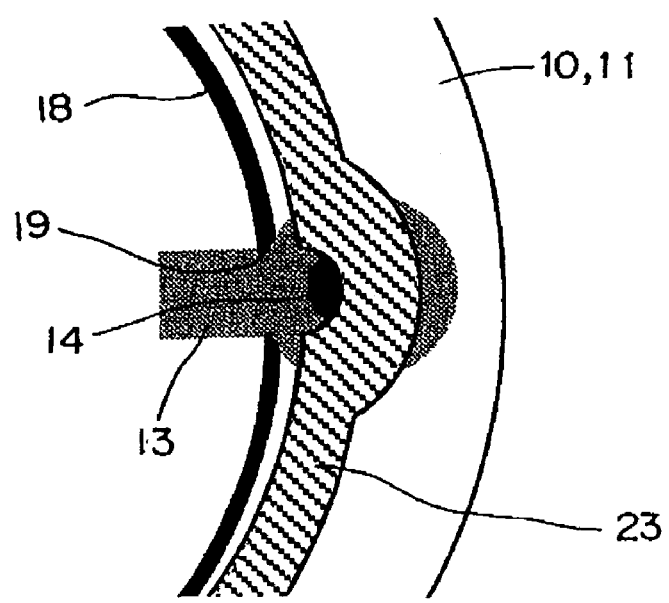

A screening printing shown in FIG. 4 can be enumerated, for example, as that printing method.

Of the lower face of a mesh screen 30, specifically, the region other than that to be printed is sealed by applying emulsion 31. Then, the screen 30 is positioned over the substrate 11 (21), and a pasty agent 32 to be applied is extended (FIG. 4A) by a rubbery squeegee 33. The agent 32 is applied to the substrate 11 (21) (FIG. 4B) through that region of the screen 30, to which the emulsion 31 is not applied. Next, as the squeegee 33 moves, the agent 34 applied to the substrate 11 (21) is separated from the agent 32 left on the upper face of the screen 30. Immediately after this, the screen 30 is caused to be separated from the substrate 11 (21) by its own tension (FIG. 4C). And, an agent applied to the substrate 11 (21) is caused to take an arcuate face by its surface tension (FIG. 4D).

In the aforementioned method of forming the electrodes 12 and 22 and so on by plating, for example, the substrate 11 (12) is treated on its surface with palladium and is then electrolessly plated with Cu all over its surface. Next, a resist mask is printed and is then electrolessly plated sequentially with Ni and Au. Next, the resist mask is peeled to remove the electrolessly plated Cu thereby to form the electrodes 12 and 22, the lead wires 13 and 16 and the through holes 14 and 17.

In the aforementioned method of forming the spacer 18 by plating, for example, the substrate 11 is treated on its surface with palladium and is electrolessly plated all over its surface with Cu. Next, a resist mask is printed and is then electrolytically plated with Cu. Next, the resist mask is peeled to remove the electrolessly plated Cu thereby to form the spacer 18.

As shown in FIG. 1, moreover, the diaphragm 20 is positioned above the base 10 and is pushed onto the base 10 in the temperature atmosphere in which only the frit 23 is softened or melted. As a result, the frit 23 is softened and is adhered, while being deformed, to the surface of the substrate 11 and to the spacer 18. At this time, the spacer 18 is not deformed even when the diaphragm 20 is pushed, so that a predetermined electrode gap can be retained. Moreover, the spacer 18 of the base 10 blocks the inward invasion of the frit 23. Therefore, the fulcrum distance of the diaphragm 20 can be determined by the diameter of the spacer 18 to retain high assembly accuracy.

On the other hand, the frit 23 functions as a seal member, too. By forming the frit 23 in the annular shape, therefore, the two substrates may be integrally jointed to seal the electrode gap completely thereby to provide the sensor, which is enabled to measure an absolute pressure by holding the electrode gap in vacuum. Moreover, the frit 23 is not necessarily continuous but may be formed discontinuously.

In a second embodiment, as shown in FIGS. 5A and 5B, that portion of the spacer 18 mounted on the base 10, in which it overlaps with the lead wire 13 and the lead wire 16 (although not shown in FIGS. 5A and 5B), is cut to form a cut portion 19. By jointing the diaphragm 20 to the base 10 as in the foregoing first embodiment, moreover, the frit 23 shields the cut portion 19 of the spacer 18.

According to this embodiment, there is not a portion, in which the spacer 18 overlaps with the lead wire 13. Therefore, the spacer 18 does not partially rise, even if formed on the substrate 11 by a printing method, for example, so that the spacer 18 is obtained with a uniform height. As a result, the diaphragm 20 is integrally jointed in parallel with the base 10 so that it has no inclination. Therefore, it is advantageous to provide a pressure sensor, which has a high assembly accuracy and a uniform detection accuracy.

Here, the cut portion is not necessarily formed in the spacer. As shown in FIG. 6, for example, the portion of the spacer 18 to overlap with the lead wire 13 maybe stepwise lowered so that the frit may not flow thereto.

Even in case the cut portion is formed in the spacer, on the other hand, it is not necessarily shielded with the frit but may be left open. Moreover, the frit may be assembled at a predetermined spacing from the spacer. Still moreover, the cut portion may be able to prevent the invasion of the frit by making its width to the necessary minimum.

According to the invention, the spacer has a higher softening or melting point than that of the frit and is positioned on the inner side of the frit. Therefore, the substrate having the frit and the substrate having the spacer are integrally jointed at the temperature of the softening or melting point of the frit. Then, the spacer is neither softened nor melted and is clamped between the two substrates so that the predetermined electrode gap can be retained. Moreover, the annular spacer blocks the inward invasion of the frit softened or melted. Therefore, it is possible to provide an electrostatic condenser type pressure sensor, which has no dispersion in the fulcrum distance of the diaphragm or the substrate to be warped in the thickness direction by an external pressure and which has a uniform detection accuracy. Especially according to the invention, the frit can be arranged near the spacer thereby to provide a small-sized electrostatic condenser type pressure sensor having a small floor area.

What is claimed is:

1. An electrostatic condenser type pressure sensor comprising flat electrodes confronting each other at a predetermined spacing and mounted on the confronting faces of two substrates,
   wherein the annular spacer is mounted on the confronting faces of said substrates around said flat electrodes; and a frit is mounted around said spacer and made of a material having a lower softening or melting point than that of said spacer, and
   wherein a cut portion is formed in that portion of said annular spacer, in which it overlaps with a lead wire of the electrode.

2. An electrostatic condenser type pressure sensor comprising flat electrodes confronting each other at a predetermined spacing and mounted on the confronting faces of two substrates,
   wherein the annular spacer is mounted on the confronting faces of said substrates around said flat electrodes; and a frit is mounted around said spacer and made of a material having a lower softening or melting point than that of said spacer, and
   wherein that portion of said annular spacer, in which it overlaps with a lead wire of the electrode, is formed low.

* * * * *